United States Patent [19]

Hughey, Jr. et al.

[11] Patent Number: 5,043,538
[45] Date of Patent: Aug. 27, 1991

[54] WATER RESISTANT CABLE CONSTRUCTION

[75] Inventors: Raburn L. Hughey, Jr.; Jerry M. Hesterlee; Frank R. Thrash, Jr., all of Carrollton, Ga.

[73] Assignee: Southwire Company, Carrollton, Ga.

[21] Appl. No.: 374,714

[22] Filed: Jul. 3, 1989

[51] Int. Cl.$^5$ .............................................. H01B 7/28
[52] U.S. Cl. ...................................... 174/107; 156/51; 174/106 R; 174/106 SC; 174/108
[58] Field of Search ............. 174/107, 106 R, 106 SC, 174/108; 156/51

[56] References Cited

U.S. PATENT DOCUMENTS

| | | | |
|---|---|---|---|
| 3,209,064 | 9/1965 | Cutler | 174/36 |
| 3,315,025 | 4/1967 | Tomlinson | 174/107 |
| 3,638,306 | 2/1972 | Padowicz | 174/107 X |
| 3,792,192 | 2/1974 | Plate | 174/102 SC |
| 3,865,971 | 2/1975 | Kumagai et al. | 174/102 R |
| 4,008,367 | 2/1977 | Sunderhauf | 174/107 |
| 4,079,190 | 3/1978 | Jones et al. | 174/102 R |
| 4,275,262 | 6/1981 | Sellars | 174/128 R |
| 4,360,704 | 11/1982 | Madry | 174/107 |
| 4,383,132 | 5/1983 | Bentvelsen et al. | 174/120 SC |
| 4,398,058 | 8/1983 | Gerth et al. | 174/106 D |
| 4,472,597 | 9/1984 | Uematsu | 174/106 SC |
| 4,501,928 | 2/1985 | Ishitobi | 174/106 SC X |
| 4,679,898 | 7/1987 | Grooten | 174/107 X |
| 4,703,134 | 10/1987 | Uematsu | 174/106 SC |
| 4,725,693 | 2/1988 | Hirsch | 174/107 |
| 4,729,629 | 3/1988 | Saito et al. | 174/107 X |

FOREIGN PATENT DOCUMENTS 2061597 5/1981 United Kingdom ............... 174/107

OTHER PUBLICATIONS

"Thermal Exposure of Power Cables with Moisture Barriers"; by Bruce Robbins, Apr. 2–7, 1989.
"Reynolds LC Shielded Power Cable"; Indicates No Author and is Undated.

Primary Examiner—Morris H. Nimmo
Attorney, Agent, or Firm—Stanley L. Tate; George C. Myers, Jr.; Victor M. Wigman

[57] ABSTRACT

A water impervious cable construction for aerial, underground, or underwater use which includes at least one central electrical conductor, an overlayer of insulation material such as a plastic, a shield layer formed of a plurality of individual conductors (or the equivalent) which may be spirally wrapped and which shield layer is embedded in a layer of semiconducting material (which may also be a plastic), a layer of overlapped moisture barrier metal foil material, and a further overlayer of insulating material. The cable is manufactured on a substantially conventional cable extrusion line in which the partially manufactured cable (insulated core or cores wrapped with the shield conductors) is introduced into an extruder and a layer of semiconducting material is extruded thereon, wrapped with metal foil tape (which may include an edge located sealant), and introduced into a subsequent extruder to form one or more outer coatings. Use of expensive or special plastic laminated metal tape in combination with "hold" tape materials is eliminated, reducing the manufacturing cost to produce the cable.

20 Claims, 2 Drawing Sheets

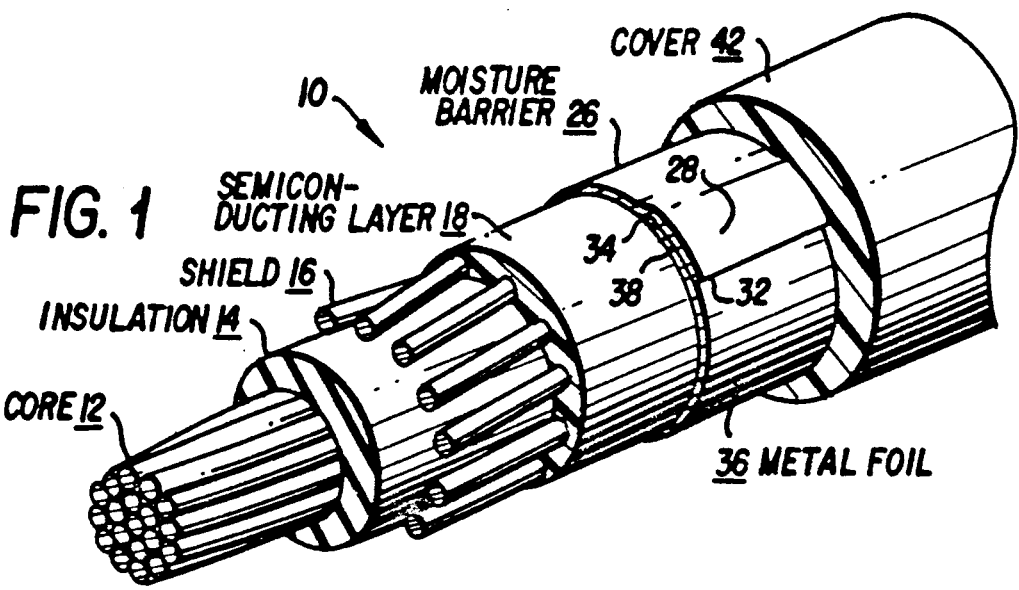
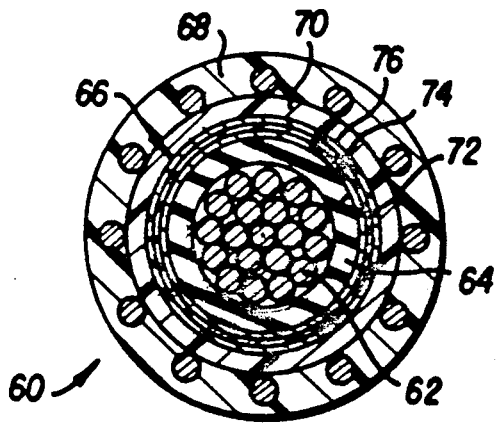
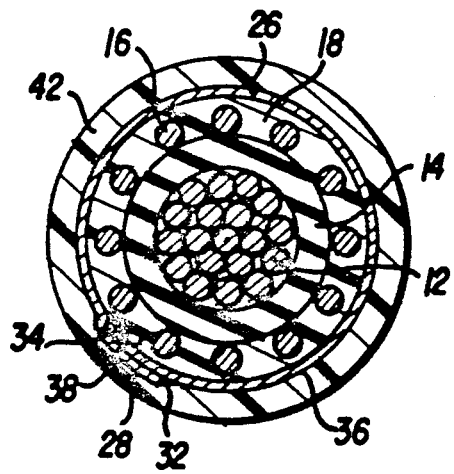
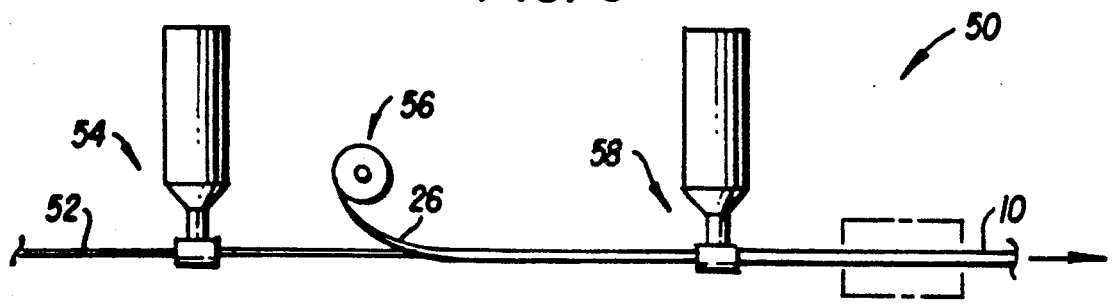

WATER RESISTANT CABLE CONSTRUCTION

TECHNICAL FIELD

The present invention relates to electrical cables having moisture or water resistant barriers. More particularly, the present invention is directed to an improved method of manufacturing water resistant cable, and electrical cables made according to the improved construction of the invention.

BACKGROUND OF THE INVENTION

Typically, water resistant cables are formed by jacketing the cable with a water impervious layer comprising a laminated, plastic coated layer, then a "hold" tape layer, then a metal shield layer. The layers of insulation are generally formed of cross-linked polyethylene or the like.

Numerous materials for the "hold" tape have been proposed, with acceptable success; however, the preferred "hold" tapes are quite expensive, and in combination with special laminated plastic/metal foil tapes are a significant cost factor (up to about 25 percent) in the manufacture of the cable.

U.S. Pat. Nos. 3,209,064; 3,315,025; 3,792,192; 3,865,971; 4,008,367; 4,079,190; 4,275,262; 4,383,132; 4,398,058; and 4,703,134 represent some of the known cable designs. U.S. Pat. No. 4,398,058 discloses a moistureproof electrical cable having a corrugated composite tube made of inner copper or aluminum and outer steel portions. This reference teaches that the composite tube is welded to effect a waterproof seal. Such a cable construction is very expensive and may not provide the necessary moisture barrier. Such construction results in a relatively inflexible cable and is subject to possible splitting of the composite tube when the cable is formed into a bend of a small radius or is subjected to thermal expansion. A discussion of alternative cable designs and their limitations is included in U.S. Pat. No. 4,398,058. U.S. Pat. No. 3,209,064 teaches the use of a copper or aluminum tape as an electromagnetic screening material, but does not teach or suggest that the tape be sealed or used as a moisture barrier. U.S. Pat. No. 3,833,132 teaches the use of a copper strip as a conductive coating, but not as a moisture barrier.

U.S. Pat. No. 4,703,134 is believed to represent more recent improvements in moistureproof high power cable designs. In the design illustrated in that patent, a special "hold" tape layer of costly electrically conductive fabric encloses and protects a water impervious layer formed of an elongated metallic material from 20 to 200 micrometers thick. The metal layer is covered on the outer sides thereof with an at least partially conductive plastic film of 20 to 200 micrometers thickness and a volume resistivity of 1 megohm-centimeter or less. A lead or lead alloy metal tape is stated as preferable. A lubricant is preferably applied to the expensive "hold" tape, which is overwrapped with a series of shield wires to form an electrostatic shield. The special "hold" tape provides the important function of substantially greater expansion in a first direction than in a second direction normal to the first. Since high voltage power cables expand and contract diametrically during heat cycling, the special "hold" tape enables such expansion and contraction without rupturing because the special "hold" tape is placed between the laminated metal foil and the shielding wires. The "hold" tape is capable of stretching circumferentially without stretching longitudinally. It is designed to flex between the laminated metal water barrier and the layer of shield wires, thus protecting the laminated metal water barrier from mechanical injury from movement of the shield wires. The special "hold" tape also provides a needed degree of corona-reducing electrical conductivity. The series of electrostatic shield wires is encapsulated within a jacket of polyvinyl chloride 66 kilovolt cross-linked insulation for outer protection.

The cable design of U.S. Pat. No. 4,703,134 is believed to be illustrated in FIG. 6, wherein the cable construction 60 includes a central core 62, a first insulating layer 64; a special, double-sided plastic laminated metal foil barrier 66 having a central metal foil layer 74 and exterior surface coatings 72, 76; and a layer of special "hold" tape 70. An outer layer, not shown, may also be included. Jacket 68 is of polyvinyl chloride, formed as an outermost layer to provide 66 kilovolt insulation.

It is believed that by fabricating the cable as shown in FIG. 6 with the heat-containing metal foil and the special "hold" tape relatively close to the conductor core, certain problems arise in effectively dissipating the heat known to be generated by passage of current through the conductive core. One result of this ineffective heat dissipation is believed to be expansion splits of the cable jackets, and resultant undesirable corona effects leading to premature cable failure.

It is an object of the present invention to provide an improved water resistant cable which avoids the use of expensive component materials.

Another object of the present invention is to enable manufacture of the water resistant cable without expensive, specifically designed equipment or materials.

Another object of the present invention is to provide a water resistant cable construction which permits normal minimum bending radius limitations in ordinary use.

A feature of the present cable invention is that it is designed to meet or exceed the product characteristics of the known cable designs which use special, expensive materials.

Another feature of the present cable invention is that it may easily be manufactured on conventional equipment.

Advantageously, a metal foil moisture barrier sandwiched between two plastic layers reduces foil susceptibility to mechanical damage, resulting in improved moisture protection. By removing the metal foil moisture barrier radially to a location outside of the shielding wires, more effective dissipation of heat is obtained, reducing undesirable corona effects and/or splitting.

An advantage of the present invention is significant material cost savings, consistent with a high quality water resistant cable product.

Another advantage of the present invention is that the novel water resistant cable can be readily manufactured on a conventional cable extrusion line, requiring the addition of only a longitudinal or spiral metal foil tape folder, which may be simply bypassed and not used when manufacturing other cable configurations on the same equipment line.

SUMMARY OF THE INVENTION

According to the present cable design, the "hold" tape is eliminated and replaced with a lower cost extrudable semiconducting material for corona-reducing purposes. The function in the prior art of protecting the laminated metal foil tape from the chafing of the metal wire shield is eliminated by avoiding moving contact of the metal foil with the shield. In the present invention, an essentially plain metal foil tape is used as the moisture barrier. However, while the metal foil tape moisture barrier of the present invention may, but need not include one or more laminated plastic foil surface coverings, the edges may include a narrow strip of polymer sealant coating to ensure a moistureproof seal along the foil edges. By avoiding use of the "hold" tape, and by moving the metal foil radially away from the cable core, heat generated in the conductor core is more efficiently transferred to the shield and more effectively dissipated, helping to avoid expansion splits. Avoiding the expensive plastic laminated additions to the metal foil tape reduces cable material costs. If desired, the metal foil moisture barrier may even be embedded in the outer covering.

Thus, according to a principal aspect of the present invention, there is provided a high voltage, high power, water resistant cable in which a conductor cable core is surrounded by conventional insulation, then overlaid with a shield which may include a plurality of shield wires encapsulated in a semiconducting layer, which layer in turn is covered by a water impervious metal foil barrier, which is then covered by (or embedded within) a tough outer jacket. The cable is manufactured by passing conventionally insulted and shield wrapped cable through a semiconducting thermoplastic extrusion head to encapsulate the shield wires. Then, an elongated metal foil in tape form is overlaid around the semiconductive jacket to provide an overlapping (e.g., greater than 100 percent) wrap coverage. A polymer sealant applied to the foil edges may be required to seal the moisture barrier. The tough outer jacket is then extruded over the metal foil to complete the water resistant sealing of the cable. It may be advantageous that the metal foil may be applied over the semiconducting layer while the semiconducting layer retains a degree of latent heat. As the semiconducting material heat diffuses into the metal foil, the foil edge polymer sealant bonds the overlapped edges. A further advantage inheres when the tough outer jacket is applied thereon. Extrusion of the outer jacket provides further compression of the metal foil wrapper to assist sealing and adds further heat energy to ensure complete sealing of the overlapping longitudinal edges. Thus, the metal foil becomes thoroughly sealed between the semiconducting layer and the outer protective jacket at the same time, forming an internal, unitary water resistant protective barrier.

By moving the metal foil barrier radially outward to a location outside the shield layer, such barrier is separated in distance from the cable core where the heat energy is primarily generated, substantially reducing the thermal expansion problems in the metal foil tape, and enabling the metal shield wires to dissipate a greater proportion of the heat generated. Encapsulating the shield conductors in a layer of semiconducting polyethylene eliminates frictional contact with the interior insulating jacket and further eliminates the need for the "hold" fabric layer. The semiconducting layer fulfills the lower resistivity, corona-reducing function of the "hold" fabric layer, and the shield wires assist in carrying heat away from the heat generation sites.

In another aspect of the present invention, the spiral layer of multiple shield wires may be replaced with a braid of thinner shield wires, or a metal shield layer may be substituted therefor, provided there is an overlayer of thermoplastic insulation which is covered with the metal foil and an outer thermoplastic layer.

In yet another aspect of the present invention, the outer sheath may be corrugated circumferentially to facilitate bending, or corrugated longitudinally to reduce sliding friction, where appropriate.

BRIEF DESCRIPTION OF THE DRAWINGS

The features and advantages of the present improved moistureproof high power cable invention will be more clearly appreciated from the following description of the preferred embodiment of the invention taken in conjunction with the accompanying drawing figures, in which like reference numerals indicate like elements, and wherein:

FIG. 1 illustrates a single conductor cable with end portions removed step-wise from the central conductor;

FIG. 2 illustrates a cross section of the single conductor cable;

FIG. 5 schematically illustrates manufacture of the single conductor cable shown in FIG. 1; and FIG. 6 illustrates a cross section of a prior art cable construction.

DETAILED DESCRIPTION OF THE PREFERRED EMBODIMENT

Figure 3:
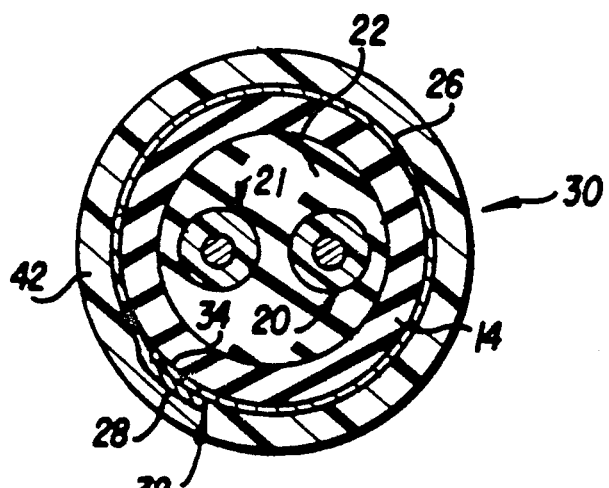
FIG. 3 illustrates a cross section of a multiple conductor cable.

The cable construction 10 of the present invention is shown in a preferred form in FIGS. 1 and 2. A core conductor 12, preferably a metallic core which is a good conductor of electrical current, is surrounded by a main or first insulation layer 14, which is preferably an extremely poor conductor of electrical current. Any good plastic insulating material may be used for insulation layer 14, including the polyvinyl chlorides or the polyethylenes. In alternative embodiments, one or more additional insulated central conductors 20 may be encased within an optional insulating layer 22 to provide a multiple conductor cable construction 30. See FIG. 3. In single or multiple conductor configurations, a conductive shield encircles the main layer of insulation 14. This shield may comprise a layer of conducting shield wires 16 as shown or a braided shield or an enclosing metal sheet, screen, or foil shield may be used.

In the preferred embodiment, the shield includes a plurality of wire conductors 16 which are encapsulated in a layer of semiconducting plastic insulation 18. This semiconducting layer may include, for example, an elastomeric material to which conductive substances have been added, such as graphite, carbon black, or other conductive material. The semiconducting layer fulfills a dual function in the present cable construction, especially in a cable construction which includes a plurality of the individual shield conductors 16. First the encapsulating layer of semiconductor plastic prevents movement of the shield wires and isolates them from contact with the moisture barrier described hereinafter, thus reducing the necessity of an expensive, special protective "hold" tape. Secondly, the semiconducting layer serves to provide the needed degree of corona-reducing electrical conductivity, equal to or exceeding that provided by the "hold" tape in the prior art cable.

Figure 4:
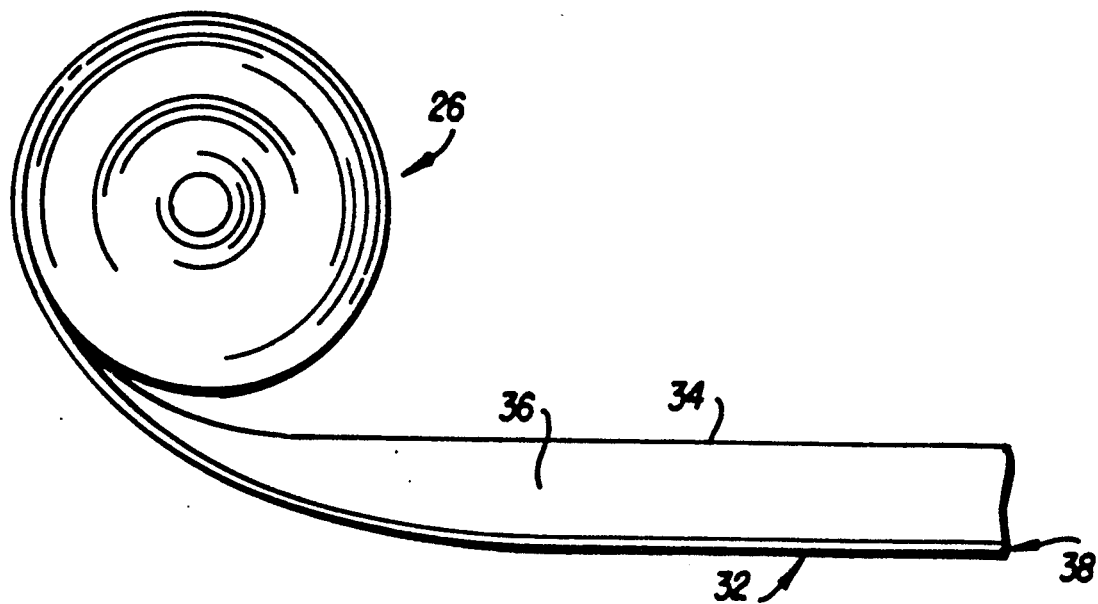
FIG. 4 illustrates a moisture barrier according to the present invention.

As thus described, the cable 10 is generally conventional in design, and does not include the expensive, special moisture barrier or special "hold" tape of the prior art waterproof cables. The elongated moisture barrier 26 of the present invention is shown in FIG. 4. It may, for example, be withdrawn from a roll and formed into a U-shape for wrapping about the cable. Moisture barrier 26 is preferably formed from an elongated metal foil substrate 36 or tape. The metal substrate may, if desired, be covered on one or both sides with a plastic covering. The barrier layer 26 encircles the semiconducting layer 18, preferably with an overlap 28 along edges 32, 34 The edges 32, 34 should overlap enough to provide a seal, as will be described later. Suitable materials for the metal foil include lead, copper, aluminum, steel, equivalent materials, and their alloys. Lead may be preferred for its malleability, although aluminum may be preferred in other applications because of its relatively lighter weight or conductivity. Copper would be preferable where a conductor is required and high electrical conductivity were paramount. Steel may provide desirable strength in some uses. The preferred metal foil thickness is between about 3 mils and about 10 mils, and more preferably about 5 to 8 mils.

It is believed that under ordinary operating conditions, the foil 26 edges 32, 34 need only form an overlap 28; however, an important feature of the present invention is that the moisture barrier 26 can be sealed along the overlap 28 of the edges 32, 34 to seal the moisture impermeable barrier along its length. A sealed barrier is important in enabling the foil to most effectively exclude moisture from entering the cable. Such an effective seal may be more important in an underground or underwater cable, for example, than in an aerial cable. A polymer sealant 38 may be applied longitudinally to either overlap edge or to both overlap edges of the metal foil to join the overlapped portion tape edges 32, 34 together. The polymer sealant should not be used where internal cable expansion at the moisture barrier radius is expected to be significant since excessive expansion may cause splitting of some metal foil moisture barrier materials. In applications where significant expansion may occur, a greater degree of coverage or overlap of the moisture barrier may be desired to ensure an effective seal. In the present preferred embodiment, the outer cover layer 42 is a tough polyethylene such as HD (high density) or LD (low density) polyethylene.

In an alternative embodiment of the invention, the metal foil moisture barrier 26 may be longitudinally corrugated; however, sealing-effectiveness may be diminished where the cable is curved around radii, especially smaller radii. The moisture barrier 26 may also be imbedded within the outer cover layer 42 whether or not it is longitudinally corrugated. Longitudinal or circumferential corrugations of the outer cover along the longitudinal dimension of the cable may also be used.

Production of the moisture resistant high power cable 10 of the present invention may be performed in a conventional plastic insulation extrusion line. See FIGS. 1 through 5. Manufacture of cables according to the present invention is begun by application, for example, by extrusion of insulation 14 around the core conductor 12. One or more additional insulated conductors 20, 21 may be grouped together (FIG. 3), in which case an additional layer of insulation 22 may be applied to retain the group of wires together. Next follows application of the shielding, such as wires 16, braid, or another foil as an electrical shield to produce an intermediate product 52, ready for application of a semiconducting encapsulation layer 18 (if shield wires are used) or a plastic shield covering insulation layer in a first extruder 54. Next, the moisture barrier 26 is unwound from a reel 56 (or equivalent) and applied to the cable over semiconductor layer 18 in a known manner. Moisture barrier 26 may be spirally wrapped along the length of the cable 10 with an overlap 28 of the 26 edges 32, 34, or preferably, it may be applied parallel to the longitudinal axis of the cable and formed circumferentially around the cable, with an overlap 28 of edges 32, 34. The edge or edges 32, 34 may be pre-coated with polymer sealant 38, or equivalent, to enable sealing the metal foil 26 edges together as previously described. The overlap 28 should be sufficient to enable sealing of the moisture barrier 26 surfaces to one another.

The polymer edge sealant coating 38 is preferably selected so that a seal is formed between the overlapping edges 32, 34 at overlap 28. Such sealing may be effectuated utilizing the latent heat of either the underlying layer or the subsequent overlaying layer (or both) as the source of sealing heat. Alternatively, another sealant material may be substituted to eliminate the need for heat in effectuating the sealing process.

After the moisture barrier 26 is applied, the overlying cover 42 is applied outside the moisture barrier in a known manner by a second extruder 58. Suitable covering materials include HD or LD polyethylene or other polymers. Where use in conduit is anticipated, low friction plastics may be used. Further, longitudinal corrugation of the outer cover 42 may facilitate installation by reduction of sliding friction. Alternatively, circumferential corrugation of outer cover 42 may be desirable to facilitate cable flexures. Longitudinal or circumferential corrugation may be performed by a corrugator 80, located near the end of the production line.

The moisture barrier 28 and outer cover 42 can be applied over a suitable premanufactured partial cable construction as described, or it may alternatively be applied as an additional step of the normal cable manufacturing process.

With the foregoing and other objects, advantages and features of the invention that will become hereinafter apparent, the nature of the invention may be more clearly understood by reference to the following detailed description of the invention, the appended claims and to the several views illustrated in the attached drawings.

Although only preferred embodiments are specifically illustrated and described herein, it will be appreciated that many modifications and variations of the present invention are possible in light of the above teachings and within the purview of the appended claims without departing from the spirit and intended scope of the invention.

We claim:

1. A high voltage, high power water resistant cable, comprising:
   a) a conductive cable core;
   b) a plastic layer surrounding said cable core;
   c) an electrically conductive shielding overlying said plastic layer;
   d) a semiconducting layer encapsulating said shielding;
   e) a moisture barrier enclosing said semiconducting layer, said moisture barrier comprising a foil having overlapping edges, said edges being unsealed to permit internal cable expansion; and
   f) an outer covering of protective, insulating plastic over said moisture barrier.

2. The cable of claim 1, wherein said moisture barrier is a metal foil.

3. The cable of claim 1, wherein said shielding includes a plurality of longitudinal wires.

4. The cable of claim 1, wherein said shielding is encapsulated in said semiconducting layer such that moving contact between said shielding and said moisture barrier is substantially eliminated.

5. The cable of claim 2, wherein said metal foil moisture barrier is coated with a plastic material on at least one side.

6. The cable of claim 2, wherein said metal foil moisture barrier is aluminum.

7. The cable of claim 2, wherein said metal foil moisture barrier is copper.

8. The cable of claim 2, wherein said metal foil moisture barrier is lead.

9. The cable of claim 2, wherein said metal foil moisture barrier is steel.

10. The cable of claim 2, wherein said metal foil moisture barrier is an alloy including a metal selected from the group which includes aluminum, copper, lead, and steel.

11. The cable of claim 2, wherein said metal foil moisture barrier is between about 3 mils and about 10 mils thick.

12. The cable of claim 1, wherein said outer layer of insulation is corrugated.

13. The cable of claim 12, wherein said outer layer of insulation is longitudinally corrugated.

14. The cable of claim 12, wherein said outer layer of insulation is circumferentially corrugated.

15. The method of manufacturing a high voltage, high power water resistant cable, comprising:
   a) providing at least one electrical cable core conductor;
   b) extruding at least one layer of insulation around said at least one core conductor;
   c) forming a metal shield layer overlying said extruded insulation layer;
   d) extruding a semiconducting layer so as to encapsulate said shield layer;
   e) forming an elongated metal foil moisture barrier around said semiconducting layer;
   f) overlapping said moisture barrier along the edges thereof;
   g) extruding an outer covering of protective, insulating plastic over said moisture barrier; and,
   h) permanently sealing the overlapping edges of the moisture barrier by the latent heat of one of said extrusion steps.

16. The method of claim 15, wherein the metal foil moisture barrier includes longitudinal edges, further including the step of forming the moisture barrier around the semiconducting layer such that the metal foil encircles the semiconductor layer in electrical contact therewith.

17. The method of claim 15, further including the step of corrugating the outer covering of protective, insulating plastic.

18. The method of claim 15, wherein the moisture barrier heat seal accomplished with latent heat from the semiconductor layer extrusion step.

19. The method of claim 15, wherein said moisture barrier heat seal is formed with the aid of latent heat from a subsequent extrusion step.

20. A water resistant cable which includes an insulation layer; an electrically conducting shielding overlying said insulation layer; a semiconducting layer encapsulating said shielding; an elongated moisture barrier comprising a metal foil face and a plastic layer face, said moisture barrier having overlapping edges; and an outer layer of insulation extruded overall, wherein said moisture barrier encircles said semiconducting layer such that the metal foil face is in electrical contact therewith and the overlapping edges are not sealed to one another.

* * * * *